United States Patent [19]

Weld

[11] 4,223,952

[45] Sep. 23, 1980

[54] AUTOMOTIVE WHEEL CONSTRUCTION

[75] Inventor: Richard G. Weld, Independence, Mo.

[73] Assignee: Weldwheels, Inc., Kansas City, Mo.

[21] Appl. No.: 896,246

[22] Filed: Apr. 14, 1978

[51] Int. Cl.² .................................................. B60B 1/06
[52] U.S. Cl. ............................ 301/63 DS; 301/63 DD
[58] Field of Search ............. 301/9 DN, 9 DP, 9 SB, 301/63 R, 63 DD, 63 DT, 63 DS, 64 SH, 64 R; 16/45, 46; 295/22, 23; 403/337, 13, 14

[56] References Cited

U.S. PATENT DOCUMENTS

| | | | |
|---|---|---|---|
| 1,431,320 | 10/1922 | Minnick | 301/64 SH |
| 1,954,757 | 4/1934 | Maranville | 301/63 DD |
| 2,252,194 | 8/1941 | Mills | 152/409 |
| 2,363,183 | 11/1944 | Hunter et al. | 301/63 |
| 3,357,747 | 12/1967 | Eldred | 301/63 |
| 3,565,490 | 2/1971 | Statz | 301/63 DD |
| 3,826,538 | 7/1974 | Lipper | 301/63 DD |
| 3,909,065 | 9/1975 | Main | 301/63 DD |
| 3,976,116 | 8/1976 | Grawey et al. | 301/63 DS |

FOREIGN PATENT DOCUMENTS

| | | | |
|---|---|---|---|
| 1480788 | 9/1969 | Fed. Rep. of Germany | 301/63 DS |
| 259442 | 7/1928 | Italy | 301/63 DS |
| 277387 | 9/1927 | United Kingdom | 301/64 SH |

*Primary Examiner*—H. Grant Skaggs
*Attorney, Agent, or Firm*—Fishburn, Gold and Litman

[57] ABSTRACT

A drawn automotive vehicle wheel comprising first and second wheel halves contiguous about a disc plate positioned in between. The wheel halves are generally cup-shaped, each having a center section and an integral rim section and the disc plate is of similar planar configuration as the respective center sections. In the respective center sections and in the disc plate are respectively congruent apertures with integral projections emanating from the rear surface of each center section, defining a central opening and alignment apertures. The wheel halves are placed and secured back to back with the disc plate between, allowing reception into the plate of the lip-like projections, resulting in the spatial correspondence of the apertures among the three wheel elements, and thus, retention of proper elemental alignment under high torque conditions. Another embodiment requires no disc plate as the projections emanate from one center section only, and are received by the corresponding apertures in the second wheel half.

2 Claims, 8 Drawing Figures

AUTOMOTIVE WHEEL CONSTRUCTION

The present invention relates to multi-purpose vehicle wheels which are decorative and yet highly suitable for both competitive and non-competitive use.

BACKGROUND OF THE INVENTION

Past split wheel constructions have addressed the problems found in alignment of wheel halves. Center elements for aligning the wheel halves about the hub have been suggested but deficiencies have been found in such elements, since, while providing axial alignment, did not address rotational alignment at the various mating points about the central opening. Also, such prior centering elements did not rotationally lock into the configuration of the wheel halves, and thus were generally unable to help transmit high torque forces to the outer portions, or rims, of the wheel.

SUMMARY OF THE INVENTION

In accordance with the present invention, first and second generally cup-shaped wheel halves, each having a center section and an integral rim section, are connected in a back to back relationship so that the rear surface of each wheel half center section is contiguous to a disc plate positioned in between. The disc plate is congruent and locking in configuration to the respective center sections, thus aiding in the transference of torque forces from the center of the wheel to all points extending radially therefrom.

In the disc plate and in the respective center sections are located an arrangement of apertures correspondent in configuration, having various functions therein. In each wheel element and disc plate are respectively congruent apertures including a central opening, lug bolt apertures, novel alignment apertures, and connecting means apertures. Integral with and emanating from the rear surface of the center section of each wheel half are projections defining the central opening and alignment apertures. The disc plate is positioned between the wheel halves, allowing the lip-like projections of each wheel half to be received by the correspondent apertures in the disc plate, resulting in the proper alignment of the wheel halves at the central opening and a plurality of points about the central opening, thus assuring proper wheel alignment and torque transmission. O-rings positioned within annular grooves on opposite sides of the disc plate form an airtight seal between the disc plate and each of the wheel halves. Insertion of connecting means through the correspondent connecting means apertures, located about the circumference of the respective wheel halves and disc plate connect all three elements together, proferably by torqued bolt/nut functional engagement.

Another embodiment of the wheel requires no disc plate for proper positioning. The first and second wheel halves are constructed as the wheel halves previously described. However, projections emanate only from the rear surface of the center section in the first wheel half. The wheel halves are placed back to back, allowing the projections of the first wheel half to be received by the correspondent apertures in the second wheel half, resulting in proper alignment of the wheel halves at the central opening and at a plurality of points about the central opening. The wheel halves, thus properly positioned, are welded together at the perimetrical intersection of the wheel halves, thus eliminating the need for connecting means apertures and associated connecting means.

It is an object of the present invention to provide a high performance, yet decorative, vehicle wheel. It is a further object of the present invention to provide a three piece wheel construction having novel means for aligning the wheel halves. It is another object of the invention to provide novel alignment means on wheel halves for proper alignment thereof. It is a still further object of the present invention to provide such a wheel construction which will better withstand torque forces applied thereto. Still another object of the invention is to have a novel three piece wheel construction, which will efficiently transfer torque or driving forces radially throughout the wheel.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features of the apparatus.

DESCRIPTION OF THE PREFERRED EMBODIMENTS

Figure 1:
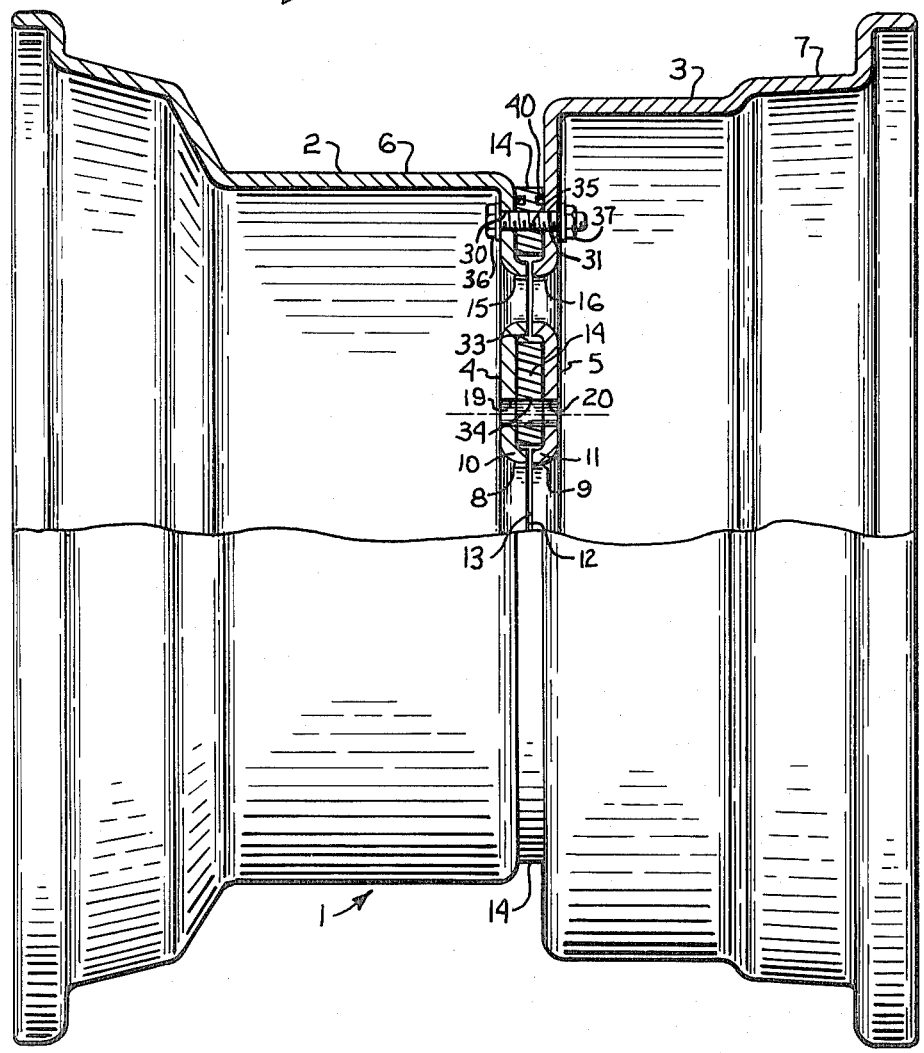
FIG. 1 is a side elevational view of a wheel embodying this invention, with a portion broken away showing a central disc plate.
Figure 2:
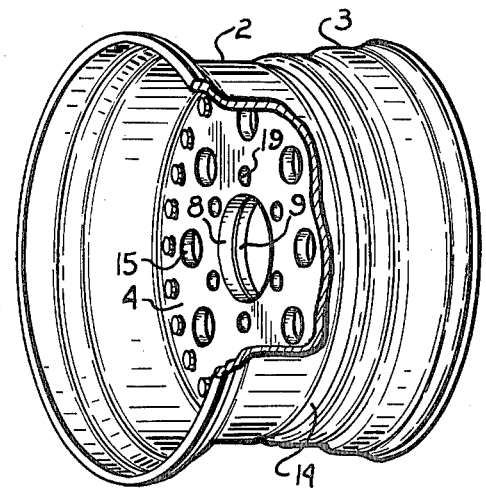
FIG. 2 is a perspective view of the wheel of FIG. 1 with a portion of the rim broken away, showing a wheel half center section.
Figure 3:
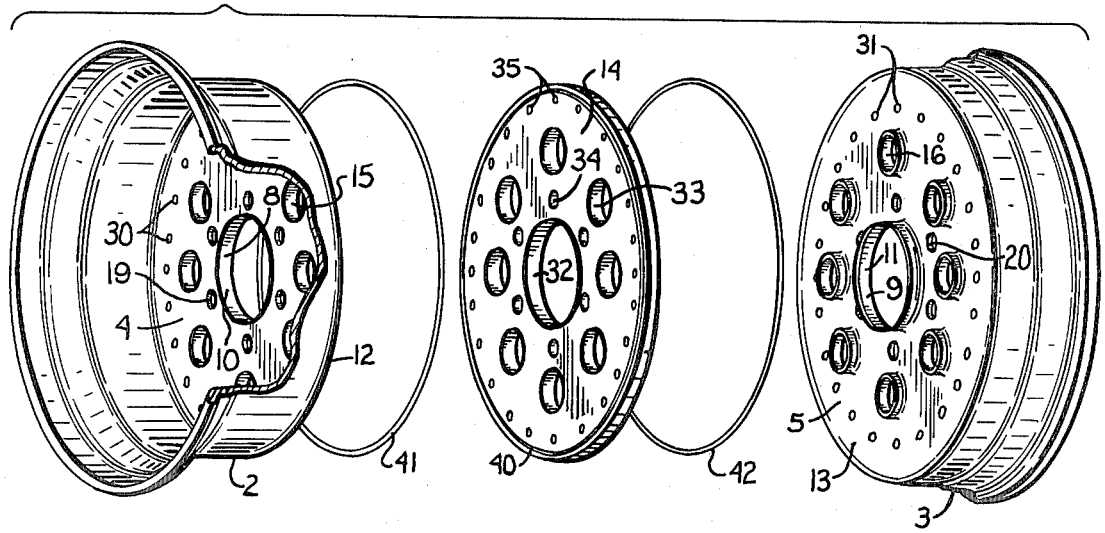
FIG. 3 is an exploded, perspective view of the wheel of FIG. 1.
Figure 4:
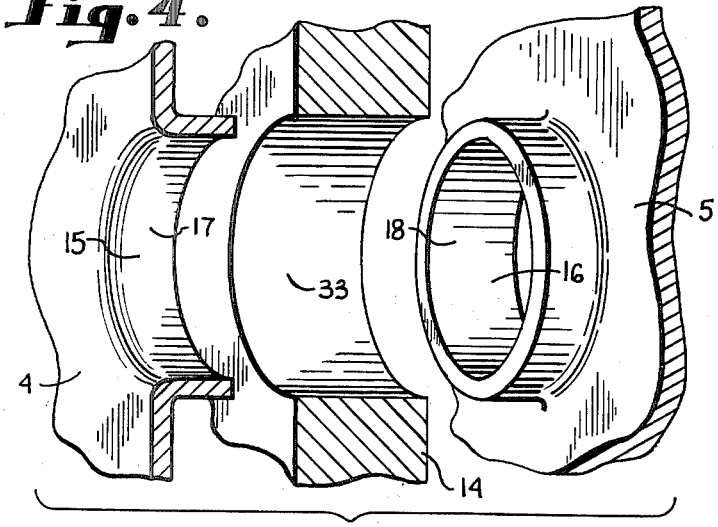
FIG. 4 is an exploded fragmentary view on an enlarged scale, of the embodiment of FIG. 1 showing wheel alignment apertures or projections and a disc prior to reception of the projections into the disc plate.

Referring to the drawings in more detail, a wheel 1, of the type sometimes known as "sprint", comprises first (front) and second (rear) generally cup-shaped, coaxial wheel halves 2 and 3. Wheel halves 2 and 3 each include circular center sections 4 and 5 and integral rims sections 6 and 7 respectively. Each wheel is preferably drawn from a metal, such as hard aluminum, into the desired shape.

Located in center sections 4 and 5 are congruent central openings 8 and 9, correspondent in configuration, and formed by opposed hub protrusions or integral projections 10 and 11. The central openings 8 and 9 are preferably circular in shape. The projections 10 and 11, emanate from the rear surfaces 12 and 13 of the respective center sectins 4 and 5 in a substantially normal direction and extend for a distance, in this example, approximately equal, but preferably not greater than, one-half the thickness of a central disc plate 14 described below.

Located about the respective central openings 8 and 9, are a plurality of congruent alignment apertures 15 and 16, forming coaxial pairs of apertures correspondent in configuration in each respective center section 4 and 5. As exemplarly shown in the drawings, said alignment apertures 15 and 16 are circular openings radially and circumferentially located about the central openings 8 and 9. Defining the alignment apertures 15 and 16 are integral projections 17 and 18 emanating normally from the rear surfaces 12 and 13 of the respective center sections 4 and 5. The projections 17 and 18, like the projections 10 and 11, extend for a distance approximately equal to, but preferably not greater than one-half the thickness of the disc plate 14.

Also located in the center sections 4 and 5, and correspondent in configuration, are congruent lug bolt apertures 19 and 20, positioned in the conventional manner so as to receive lug bolts (not shown) permittng connection of the wheel 1 to a vehicle.

Further located in the respective center sections 4 and 5, in a nearly peripheral circular pattern are a plurality of congruent connecting means apertures 30 and 31 referred to below.

The disc plate 14 has opposed faces of the same planar configuration as the rear center section surfaces 12 and 13. Located in the disc plate 14 are apertures correspondent in configuration and respectively congruent with those apertures found in the respective center sections 4 and 5. Thus, a disc plate central openings 32, alignment apertures 33, lug bolt apertures 34, and connecting means apertures 35 correspond respectively with openings and apertures 8, 9, 15, 16, 19, 20, 30 and 31, resulting in respective congruity, when the wheel halves 2 and 3 and disc plate 14 are assembled. The central opening 32 and alignment apertures 33 are sized to telescopically snugly receive the correspondent projections, producing a strengthened and interlocked system.

Figure 5:
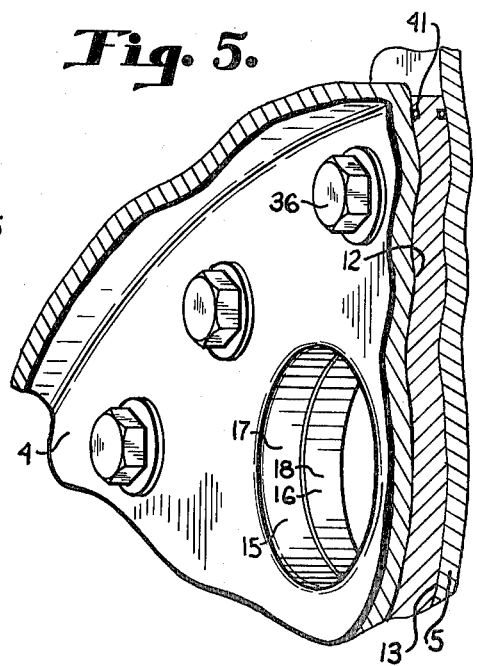
FIG. 5 is a fragmentary view, on an enlarged scale, showing a functionally engaged assembly of wheel halves and disc plate.

In assembly, the wheel halves 2 and 3 are placed in a back to back relationship with the disc plate 40 therebetween and interlocked, as noted. In this engaged position, the rear surfaces 12 and 13 of the respective center sections 4 and 5 are contiguous to the opposed surfaces of the disc plate 14. As exemplarly shown in FIG. 5, the free edge of the respective projections 17 and 18 are contiguous, or nearly so, in the proper reception position. The respective multiple projections, when properly received by the corresponding disc plate apertures, results in the accurate rotational and axial alignment and relative fixing of the wheel halves. The disc plate 14, by such reception, accomplished not only multiregistration among the corresponding apertures, but also adds structural stability and torque transmitting strength throughout the entire wheel radial area. Also such apertures are attractive in appearance and allow air circulation in and about the wheel, enhancing brake cooling as well as overall wheel use.

Once said registration is accomplished, connecting means can be inserted through the congruent connecting apertures 30, 35 and 31, preferably bolts 36 and nuts 37, functionally engaging and securing the three wheel elements in structural unity.

The disc plate 14 includes means for forming an airtight seal between the respective wheel halves 2 and 3 in the form of annular grooves 40 located on the opposed surfaces thereof and adapted to receive elastomeric O-rings 41 and 42, therein. With the wheel properly assembled, the O-rings 41 and 42 contact the rear surfaces 12 and 13 respectively of the wheel halves, thus preventing air leakage from the tire and the intrusion of foreign matter.

Figure 6:
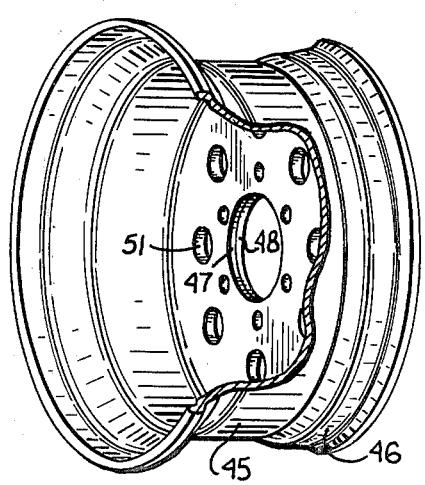
FIG. 6 is a perspective view of another embodiment of this invention, showing a wheel section of the rim broken away.
Figure 7:
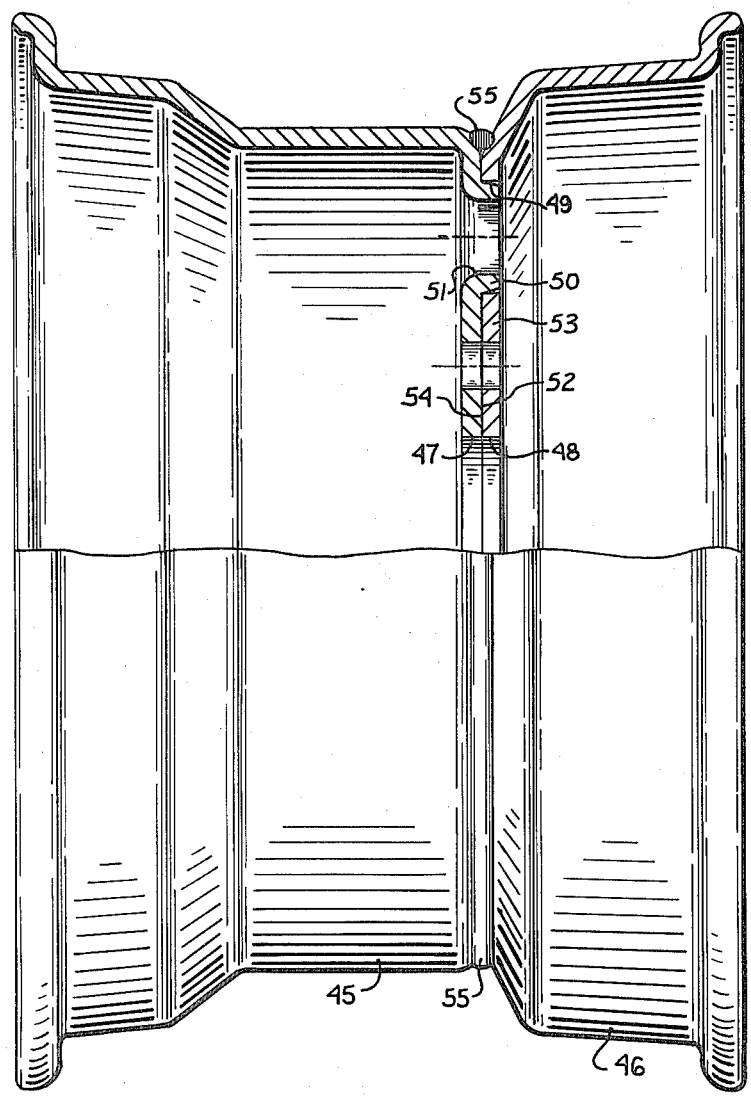
FIG. 7 is a side elevational view of the embodiment of FIG. 6, with a portion broken away showing interior construction at mating faces of wheel halves.
Figure 8:
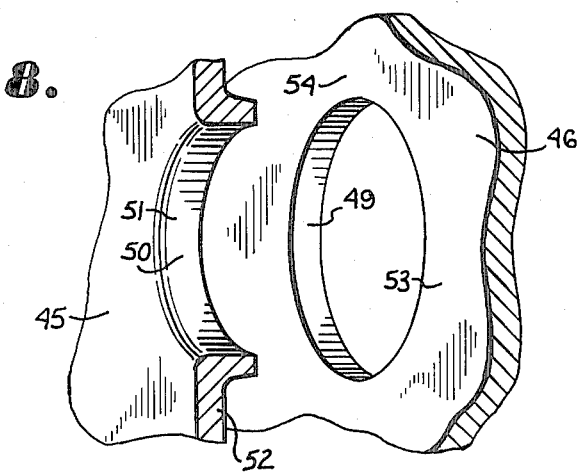
FIG. 8 is an exploded fragmentary view on an enlarged scale, of the embodiment of FIG. 7 showing an alignment aperture or projection of one wheel half aligned for receipt into an aperture of the other wheel half.

Another embodiment of this invention is shown in FIG. 6, 7 and 8, sometimes known as "midget". First and second wheel halves 45 and 46 are constructed generally according to the preceding description but no projections define the central openings 47 and 48 thereof or the alignment aperture 49 of the second wheel half 46. As shown in FIGS. 7 and 8, projections 50 define alignment apertures 51 in the first wheel half 45 and the apertures 49 and 51 form coaxial pairs. The projections 50 preferably extend beyond the first wheel half rear surface 52 a distance generally equal to the thickness of the center section 53 of the second wheel half 46 is, in this example, devoid of projections.

No central disc plate, corresponding to the plate 14, is utilized in this wheel embodiment, but rather, the wheel halves 45 and 46 are placed directly back to back so as to allow the alignment apertures 49 to functionally accept the corresponding projections 50. Thus, the wheel halves 45 and 46, when so assembled and secured together, function as a single, torque transmitting unit, as in the preceding embodiment.

One method of securing the wheel halves together is through welding, forming a head 55 metrical engagement thereof, eliminating the need for connecting means apertures found, by way of example, in the preceding embodiments.

While the invention has been described with respect to preferred physical embodiments constructed in accordance therewith, it will be apparent to those skilled in the art that various modifications and improvements may be made without departing from the scope and spirit of the invention. Consequently, it is to be understood that the invention is not to be limited by the specific illustrative embodiments, but only by the scope of the appended claims.

What is claimed is:

1. An automative vehicle wheel comprising:
   (a) first and second drawn sheet wheel halves, said wheel halves each including a center section and a rim section, a central opening in said respective center sections;
   (b) a plurality of opposed integral projections in said center sections and defining alignment apertures, said center section alignment apertures being radially spaced from said central openings and forming congruent and correspondent pairs of alignment apertures, said projections having an outer surface generally parallel to the axis of said center section and facing ends closely spaced from one another;
   (c) an alignment element including a disc plate positioned between said center sections, apertures in said disc plate;
   (d) said center section projections being received into said disc plate a sufficient distance to produce a torque transmitting, substantially interlocked relationship between said disc plate apertures and said projections, whereby said wheel halves and disc plate are engaged such that torque applied about the axis of one of said wheel halves is transferred through the interlocked disc plate and projections to the other of said wheel halves;

(e) means connecting said wheel halves; and (f) means forming an airtight seal between said disc plate and each of said wheel halves.

2. An automotive vehicle wheel comprising:

(a) first and second drawn sheet wheel halves, said wheel halves each including a center section and a rim section, a central opening in said respective center sections;

(b) a plurality of opposed integral projections in said center sections and defining alignment apertures, said center section alignment apertures being radially spaced from said central openings and forming congruent and correspondent pairs of alignment apertures, said projections having an outer surface generally parallel to the axis of said center section and facing ends closely spaced from one another;

(c) an alignment element including a disc plate positioned between said center sections, apertures in said disc plate;

(d) said center section projections being received into said disc plate a sufficient distance to produce a torque transmitting, substantially interlocked relationship between said disc plate apertures and said projections, whereby said wheel halves and disc plate are engaged such that torque applied about the axis of one of said wheel halves is transferred through the interlocked disc plate and projections to the other of said wheel halves;

(e) means connecting said wheel halves;

(f) circular grooves in said disc plate and surrounding said disc plate apertures; and (g) O-ring seals in said grooves and bearing against said center sections.

* * * * *